(12) United States Patent
Paquette et al.

(10) Patent No.: US 12,147,284 B2
(45) Date of Patent: Nov. 19, 2024

(54) CHARACTERIZING FAULT INJECTION ON POWER DISTRIBUTION NETWORKS WITH VOLTAGE SENSORS

(71) Applicant: MITRE Corporation, Bedford, MA (US)

(72) Inventors: Michael J. Paquette, Bedford, MA (US); Brian D. Marquis, Bedford, MA (US); Rachel Bainbridge, Bedford, MA (US); Joe Chapman, Bedford, MA (US)

(73) Assignee: MITRE Corporation, Bedford, MA (US)

( * ) Notice: Subject to any disclaimer, the term of this patent is extended or adjusted under 35 U.S.C. 154(b) by 14 days.

(21) Appl. No.: 17/706,186

(22) Filed: Mar. 28, 2022

(65) Prior Publication Data

US 2023/0305612 A1 Sep. 28, 2023

(51) Int. Cl.
*G06F 1/30* (2006.01)
*G06F 11/00* (2006.01)

(52) U.S. Cl.
CPC .............. *G06F 1/30* (2013.01); *G06F 11/006* (2013.01)

(58) Field of Classification Search
CPC .................................. G06F 1/30; G06F 11/006
See application file for complete search history.

(56) References Cited

U.S. PATENT DOCUMENTS

| | | | | |
|---|---|---|---|---|
| 2015/0195082 A1* | 7/2015 | Han | ........................ | G06F 1/30 713/189 |
| 2015/0346246 A1* | 12/2015 | Tasher | ............. | G01R 19/16552 324/762.01 |
| 2015/0369865 A1* | 12/2015 | Hershman | ............ | H03K 19/003 326/8 |
| 2017/0155279 A1* | 6/2017 | Eckhardt | ........... | H02J 13/00016 |
| 2018/0232542 A1* | 8/2018 | Martin | ..................... | G06F 21/86 |
| 2019/0372751 A1* | 12/2019 | Yanamadala | ........... | H04L 9/004 |
| 2021/0004461 A1* | 1/2021 | Guilley | ................. | H01L 23/576 |
| 2021/0150027 A1* | 5/2021 | Sonntag | ................ | G06F 21/556 |

(Continued)

FOREIGN PATENT DOCUMENTS

WO WO-2020137606 A1 * 7/2020 ........... H01L 23/552

OTHER PUBLICATIONS

M. Paquette, B. Marquis, R. Bainbridge and J. Chapman, "Visualizing Electromagnetic Fault Injection With Timing Sensors," 2021 IEEE Physical Assurance and Inspection of Electronics (PAINE), Washington, DC, USA, Nov. 30, 2021, pp. 1-8 (Year: 2021).*

(Continued)

*Primary Examiner* — Matthew M Kim
*Assistant Examiner* — Indranil Chowdhury
(74) *Attorney, Agent, or Firm* — Jones Day

(57) ABSTRACT

Power and electromagnetic fault injection vulnerabilities in an integrated circuit (IC) can be characterized sampling one or more integrated timing sensors in real-time or by equivalent-time sampling. To achieve equivalent-time sampling, a series of fault injection attempts are performed. An array of timing sensors implemented in part of the IC capture a measure of relative propagation delay, which fluctuates proportionally with instantaneous voltage. Increased voltage fluctuation can indicate elevated probability of faults in digital logic. Related apparatus, systems, techniques and articles are also described.

22 Claims, 8 Drawing Sheets

(56) References Cited

U.S. PATENT DOCUMENTS

2021/0405100 A1\* 12/2021 Champeix .......... G01R 29/0878
2022/0180003 A1\* 6/2022 Tehranipoor ........ G06F 30/3308
2023/0401342 A1\* 12/2023 Tajik ....................... G06F 21/88

OTHER PUBLICATIONS

Y. Luo, Y. Zhang, S. Duan and X. Xu, "A Cautionary Note on Building Multi-tenant Cloud-FPGA as a Secure Infrastructure," 2022 International Conference on Field-Programmable Technology (ICFPT), Hong Kong, 2022, pp. 1-6 (Year: 2022).\*

H. Wang, H. Li, F. Rahman, M. M. Tehranipoor and F. Farahmandi, "SoFI: Security Property-Driven Vulnerability Assessments of ICs Against Fault-Injection Attacks," in IEEE Transactions on Computer-Aided Design of Integrated Circuits and Systems, vol. 41, No. 3, pp. 452-465, Mar. 2022 (Year: 2022).\*

C. Deshpande, B. Yuce, L. Nazhandali and P. Schaumont, "Employing dual-complementary flip-flops to detect EMFI attacks," 2017 Asian Hardware Oriented Security and Trust Symposium (AsianHOST), Beijing, China, 2017, pp. 109-114 (Year: 2017).\*

\* cited by examiner

US 12,147,284 B2

CHARACTERIZING FAULT INJECTION ON POWER DISTRIBUTION NETWORKS WITH VOLTAGE SENSORS

GOVERNMENT RIGHTS LICENSE

This invention was made with government support under Contract No. W56KGU-18-D-0004 awarded by the United States Department of Defense. The U.S. government has certain rights in the invention.

TECHNICAL FIELD

The subject matter described herein relates to enhanced techniques for characterizing vulnerability of an integrated circuit (IC) to fault injections that affect the power distribution network (PDN). Effects on the PDN due to fault injections can be measured using distributed voltage sensors, which may take various forms.

BACKGROUND

A variety of embedded systems, including Internet of Things (IoT) devices, are physically accessible to attackers. While many embedded systems are designed with protocol level security, implementations are often not secure; it is difficult to protect against hardware-based attacks. Instead of targeting weaknesses in security protocols or algorithms, hardware attacks exploit the hardware platforms on which these security features are implemented. These kinds of attacks pose a growing threat to the security of embedded systems.

Fault injection attacks can cause corruptions to control and data flow in microelectronic systems, including digital logic, programmable logic, microprocessors, and microcontrollers, etc. Such corruptions can be used by an adversary to enable unintended functionality, deny service, and even bypass security measures. In addition, fault injection attacks have been used to defeat a secure boot process by enabling access to a disabled command line. Fault injection attacks also pose a threat to hardware-based security primitives such as true random number generators (TRNGs) or cryptography cores.

SUMMARY

In a first aspect, power distribution network-based (PDN-based) fault injection vulnerabilities in an integrated circuit (IC) are characterized by delivering a series of repeated power distribution network-based fault injection attacks comprising a plurality of faults. Effects of the fault are captured by an array of sensors forming part of the IC. These captured effects correspond to instantaneous voltage measurements by such sensors. Using the captured effects of the faults, a vulnerability map visually identifying locations of vulnerable locations in the IC can be generated. This map can be visualized in an electronic display, loaded into memory, stored in physical persistence and/or transmitted over a network to a remote computing device.

In some variations, the faults can be commenced at an initial pulse delay and a delay of subsequent faults is iteratively stepped.

In some variations, the delivery of faults can include arming a pulse generator to deliver a series of electromagnetic pulses through a probe on to the IC. The probe can be selectively moved over a predetermined surface routing relative to the IC. In some variations, the probe is moved using a probe positioner. The probe can take various shapes including, without limitation, cylindrical (e.g., sharp and flat, etc.) and crescent shaped.

The data stored in memory can be analyzed to identify one or more vulnerable locations in the IC. Sensors on the IC can be associated with other components on the IC such that the one or more vulnerabilities are spatially specified in relation to components in which the associated sensor captures effects above or below a pre-defined threshold.

The IC can take various forms including a field-programmable gate array (FGPA) or an application specific integrated circuit (ASIC).

The voltage sensors can take various forms including, for example, sensors that use timing information to infer voltage such as time-to-digital converters (TDCs) or ring oscillators (ROs). When placed in a grid throughout the IC, these sensors can spatially characterize voltage levels on an PDN forming part of the IC during fault injection.

In an interrelated aspect, a system for characterizing power distribution network-based fault injection vulnerabilities in an IC includes at least one probe, a probe positioner coupled to the at least one probe, and a controller comprising memory and at least one data processor. The controller memory stores instructions which, when executed, result in operations including delivering a series of repeated power distribution network-based fault injection attacks comprising a plurality of faults across the IC using the at least one probe while it is moved by the probe positioner. With such an arrangement, an array of sensors forming part of the IC capture effects of the faults during each iteration. These captured effects correspond to instantaneous voltage measurements by such sensors.

The current subject matter provides many technical advantages. For example, as provided herein, the ability to observe the state of an IC's PDN over time and two-dimensional space during a fault injection attempt provides valuable visibility into the effects of the fault. This enhanced visibility can better inform design and placement of countermeasures to address any vulnerabilities.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to sensing and characterization (e.g., visualization, etc.) techniques that reveal spatiotemporal behavior on a power distribution network (PDN) during fault injection attempts. PDN-based faults are any fault injection attempts that affect the voltage levels supplied to a microelectronic IC. Electromagnetic fault injection (EMFI) is an example of a PDN-based fault injection attack which uses precisely timed electromagnetic (EM) pulses to manipulate the behavior of digital hardware and even bypass security features. Techniques are provided herein for observing the analog effects of EMFI attempts with high temporal and spatial resolution. A grid of time-to-digital converters (TDCs) implemented within a microelectronic IC including field programmable gate arrays (FPGA) can be used to infer internal spatial voltages on the PDN.

A PDN provides supply voltage to circuits throughout a chip. In modern CMOS technology, propagation delay is directly proportional to supply voltage. Therefore, approximate voltage levels can be inferred from propagation delay. A dense grid of timing sensors, such as TDCs, can be implemented in an IC, such as an FPGA or ASIC, to infer instantaneous voltage measurements throughout a region of the chip. By sampling these sensors during a fault injection attempt, the effect of an attack on the PDN can be characterized over space and time at an arbitrary time resolution. By combining these spatial voltage observations with corresponding digital faults throughout the integrated circuit, the relationship between PDN voltage and fault success can be examined to bring new depth to fault models.

EMFI is a powerful fault technique that emerged in the early 2010's. EMFI is achieved by sending high voltage pulses into an electromagnetic (EM) probe located proximal to a chip creating high power, localized EM fields that disrupt chip function. It has been shown that EMFI can produce fault effects in a range of devices and that the locality of these fault effects can be precisely controlled by probe location. However, due to the analog nature of EMFI's interaction with a device, it is difficult to fully model or observe the effects of EMFI on a chip.

It has been theorized that the resulting electromotive forces (EMFs) cause currents in the largest metal layers of the device, causing parasitic currents. Asymmetries between the $V_{dd}$ and GND metal layer grids can lead to voltage spikes and dips which can cause digital faults.

Time-to-digital converters (TDCs) can be used for measuring sub-nanosecond delays between signals. TDCs measure the relative time difference between a start signal, which arrives first, and a stop signal, which arrives later.

Figure 1:
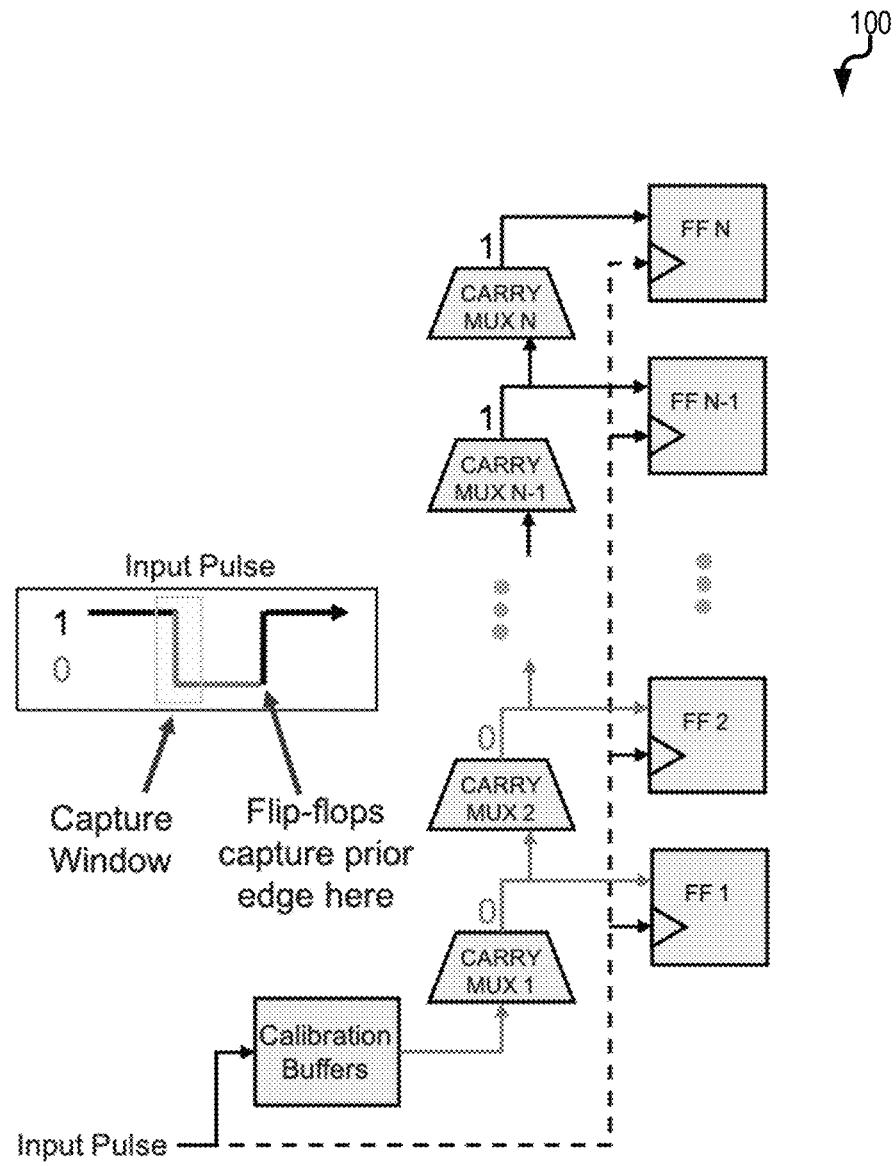
FIG. 1 is a diagram of a time-to-digital converter (TDC)

One TDC implementation is illustrated in diagram 100 of FIG. 1 in which each illustrated CARRY MUX is implemented using a last multiplexer in each slice's CARRY4 element. This TDC measures the time between the two edges of an input negative pulse. This pulse is input into a chain of buffers and a parallel chain of flip-flops. The flip-flop chain captures the state of the buffer chain when the rising edge arrives. By that time, the falling edge will have propagated through part of the buffer chain. The distance traveled through the buffer chain before being sampled is the digital output; this value indicates the cumulative propagation delay of the buffer chain. The resolution of a TDC depends on the minimum delay step that it can detect.

FPGAs can be organized in a fabric of different digital hardware resources contained in individual tiles. Tiles within a column are homogenous, while tiles within a row are heterogeneous. In some FPGAs, Configurable Logic Block (CLB) tiles contain one or more slices. Slices contain basic elements like look-up tables (LUTs), flip-flops, and carry structures. Carry structures in a column can be connected by dedicated routing to form a carry chain. Because this routing is identical across all adjacent CLB tiles and each carry structure has a low propagation time, carry chains can be used as the TDC buffer chain.

EMFI can cause parasitic currents in the metal layers of ICs due to an inductive coupling between the probe and the 3D metal layer meshes which form wire loops. EMFI can also cause sampling faults on D flip-flops (DFFs)—a common digital circuit element. In this regard, sampling faults are disruptions to the sampling process of DFFs. Through simulation and empirical fault experimentation, it has been shown that EMFI causes a disruption to the clock and D inputs to the DFF creating a race condition between the two signals which can lead to faulty results.

With the current subject matter, digital timing sensors can be used for fault measurement/detection as propagation delay is directly proportional to supply voltage in CMOS logic. As such, timing sensors can be used to infer internal voltages. Digital timing sensors such as ROs and TDCs can be used to detect instances of high probability of faults in digital logic due to disturbances in propagation delay caused by voltage fluctuation.

The current subject matter allows for the modeling and characterization (e.g., visualization, simulation, etc.) of the effects of PDN-based fault injection on an IC using voltage measurements. Such an arrangement is advantageous compared to externally collected measurements, which do not sufficiently reveal internal IC behavior due to high attenuation and distance from internal circuitry. Single integrated analog-to-digital converters (ADCs) typically lack both the spatial information as well as the necessary bandwidth to characterize the high-frequency transient effects of these faults. Therefore, as provided herein, a grid of voltage sensors can be implemented in the programmable logic of an FPGA to measure the analog voltage effects of fault injection. For example, timing sensors and ring oscillators can be used to measure, visualize, or otherwise characterize the voltage effects of fault injection across time and two-dimensional (2D) space.

To validate the current subject matter, experiments for performing EMFI were conducted using the equipment below. For a target FPGA, a NEXYS A7 board equipped with a Xilinx Artix-7 FPGA was used. With this board, the major components of the FPGA design were the sensor grid, the supporting state machine, and serial interface. When a capture is triggered on the sensor grid, the FPGA outputs a trigger signal used by the EMFI pulse generator.

To generate pulses, a pulse generator such as the AVTECH AVRK-4-B pulse generator was used. This device can generate pulses with amplitudes up to 750V and pulse-widths ranging from 6 ns to 20 ns. The pulse rise-time is at most 4 ns. This pulse generator can have a configurable pulse-delay; this is used to control the relative delay between an external trigger-in and the pulse output. With this particular generator, pulse-delay can be stepped in increments as low as 100 ps. Amplitude, pulse-width, and pulse-delay parameters can be programmatically configured using the RS-232 serial port interface.

The probe can be selectively moved using, for example, an X-Y-Z probe positioner. During experimentation, a Detectus HRE Series EMC probe positioner was used to precisely control the position and orientation of an EM probe. This positioner allows for the rapid performance of EMFI tests over multiple probe positions with high precision and repeatability. The positioner can set the X, Y, Z position with 0.025 mm resolution and rotation of the probe via an RS-232 serial control interface. The activation of the probe and/or the probe positioner can be done responsive to signals received from a controller (which in turn can include memory and one or more processors).

EMFI probes typically comprise of wire coils optionally wrapped around a core material (e.g., ferrite, etc.) to create electromagnetic fields when current passes through the wire. As used herein, one example EMFI probe category is referred to as a crescent probe, named after the shape of its core. The crescent probe creates a U-shaped magnetic field connecting both downward facing terminals of the ferrite. The resulting dominant EMF of the crescent probe is a straight-line vector through the U-shaped magnetic field loop as per Faraday's law of induction. The probe can be rotated so as to direct EMF at a desired angle. Other types of near field electromagnetic probes can be used such as flat or sharp cylindrical probes.

Figure 2:
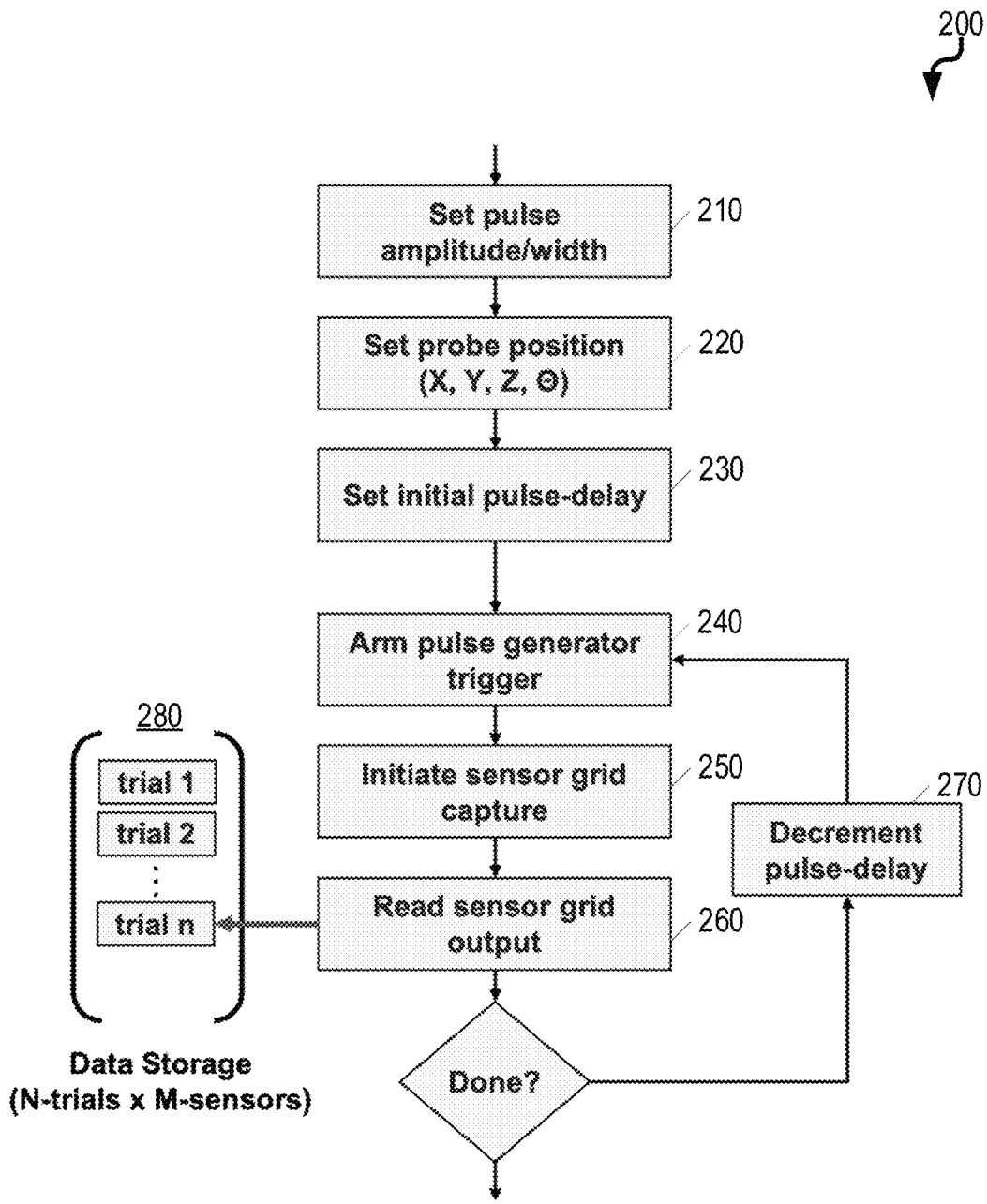
FIG. 2 is a first process flow diagram for characterizing fault injection on power distribution networks of an IC with timing sensors.

It can be assumed that the target device (i.e., the IC being tested/characterized) behaves as a time-invariant and causal system that can be reset to a consistent initial state. With these assumptions, an equivalent-time sampling technique can be applied over repeated measurements with fine-grained changes in initial pulse-delay to reconstruct the time-varying PDN response from repeated one-shot measurements. This process is depicted in the process flow diagram 200 of FIG. 2. Prior to the application of pulses, at 210, pulse amplitude and/or width can be set. In addition, at 220, an initial position of the probe can be set and/or an area of coverage for the probe in relation to the IC being characterized can be established. Further, at 230, an initial pulse-delay can be established. It will be appreciated that these various input operational parameters can be modified/changed based on the type and size of IC being characterized. Once the operational parameters are specified (or a default set of parameters is used), at 240, the pulse generator is trigger and armed. The array/grid of sensors, at 250, captures voltage levels at 260 and the output of these sensors can be stored in memory 280 (e.g., local memory, a local data storage, etc.) for later access or transport to a remote computing system (e.g., a cloud service, etc.). The process of applying pulses can continue, at 270, with the pulse-delay being decremented and the process of generating pulses (240), sensor grid capture (250), and sensor grid output read (260) can be continued until a desired value is obtained (e.g., number of iterations, etc.).

Effective sampling at 1 GHz of the PDN was obtained by decrementing pulse-delay by 1 ns between successive TDC captures of otherwise identical EMFI attempts.

Figure 3:
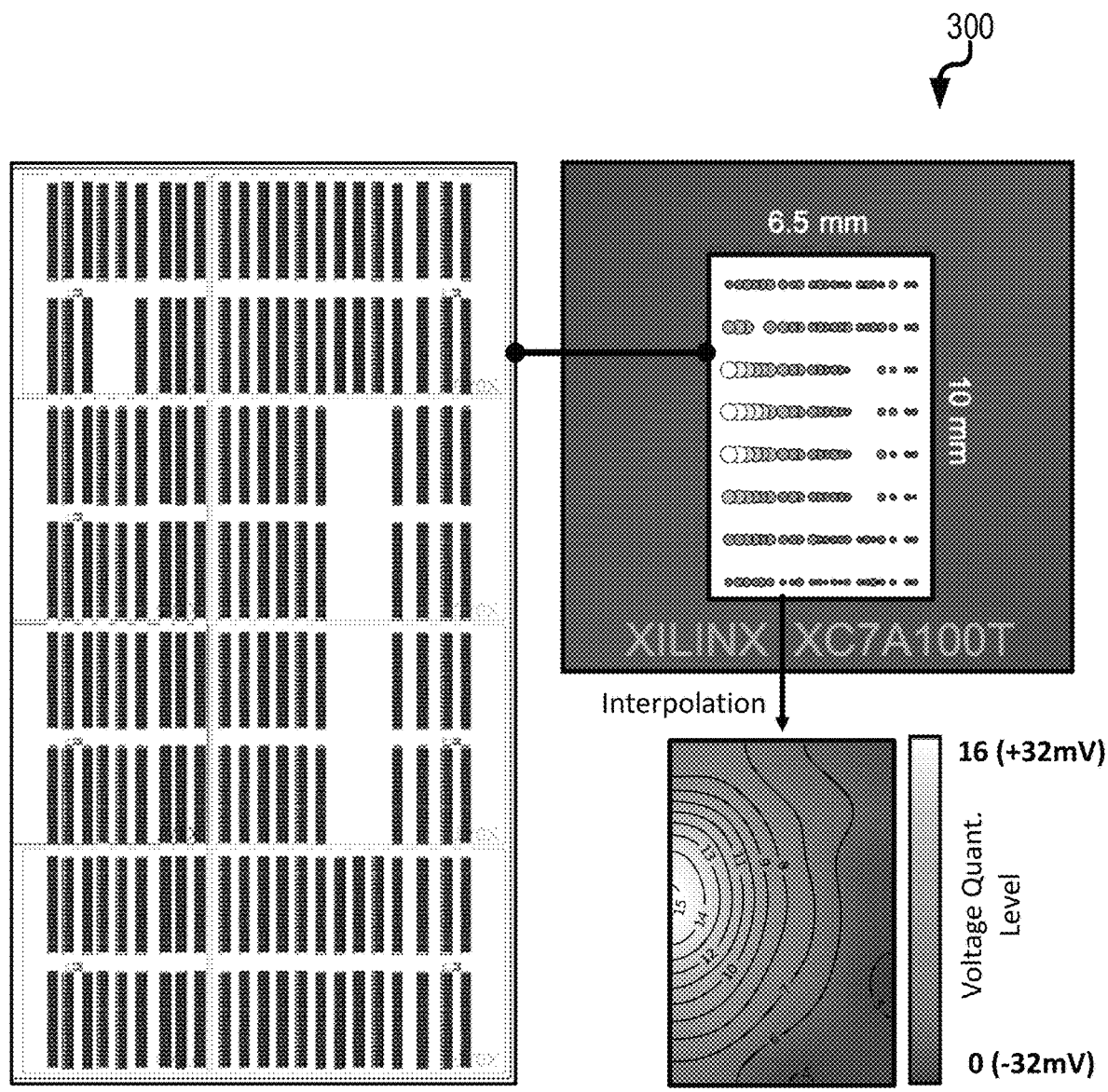
FIG. 3 is a diagram illustrating layout of TDCs in the programmable logic of a field-programmable gate array (FPGA) package.

The layout of the TDC is shown in diagram 300 of FIG. 3. Referring still to FIG. 3, the left, is a layout of TDCs in the programmable logic (PL). A single TDC is highlighted. On the right, the FPGA package is shown in which the box indicates the PL region of the die where TDCs can be implemented.

Figure 4:
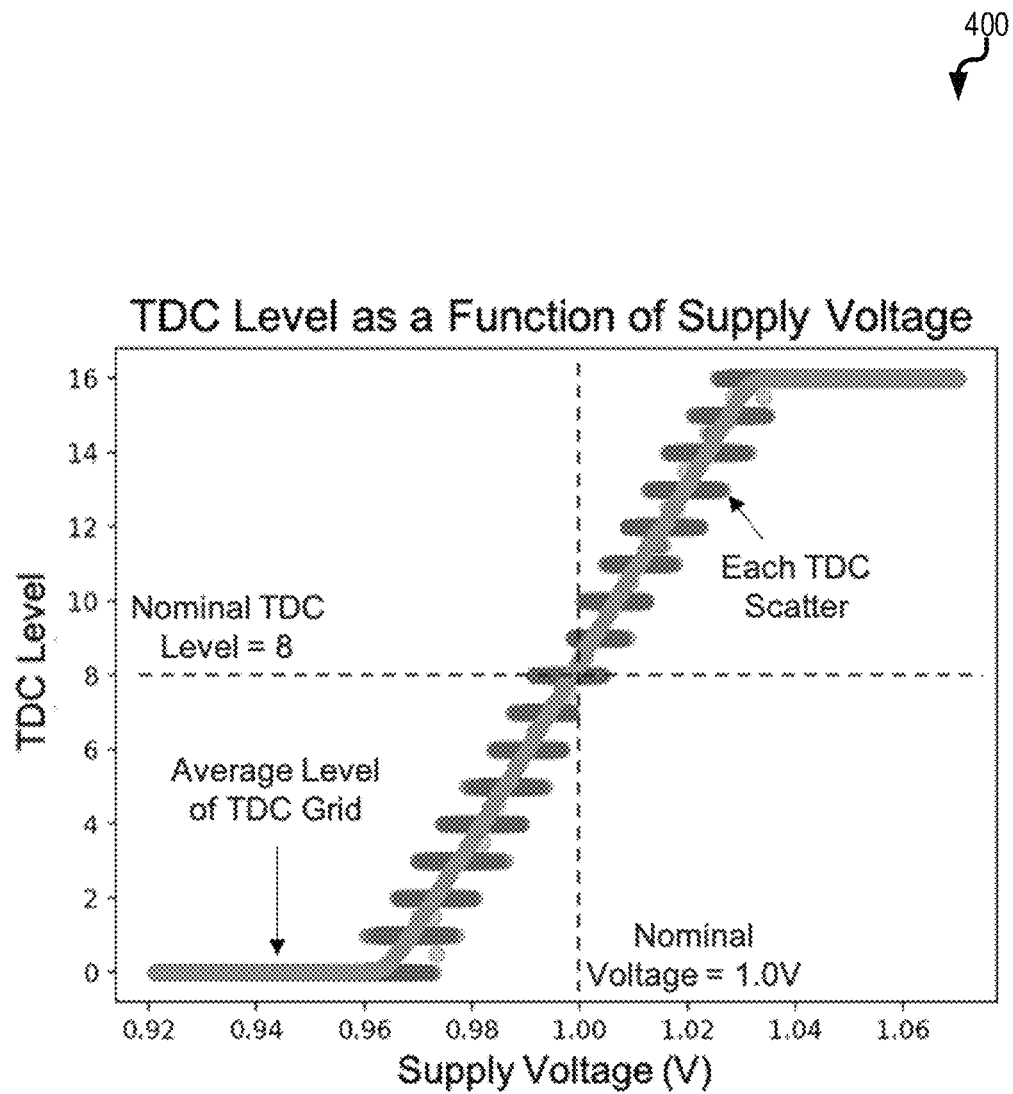
FIG. 4 is a diagram illustrating median TDC outputs and mean of all TDC outputs over a range of supply voltages.

A 16-tap carry chain-based TDC was implemented on the Xilinx Artix-7 (XC7A100T). The start and stop signals are the negative and positive edges of a single 5 ns pulse. Calibration logic was added to center the transition of 1's to 0's at the center of the TDC carry chain while in a nominal state. The relationship between internal voltage, measured by the on-chip internal voltage sensor, and TDC output for linearity and sensitivity on a grid of 162 TDCs was characterized as shown in diagram 400 of FIG. 4. With this voltage relationship, absolute spatial voltage from TDC level can be determined at a resolution of about 4.2 mV. As shown in FIG. 4, median TDC outputs and the mean TDC output are directly proportional with the supply voltages are visualized. It was shown that the TDC implementation on the Artix-7 FPGA is sensitive to voltage at a rate of approx. 4.2 mV per TDC level. With 17 discrete levels (0 to 16), the dynamic range is about 71.4 mV. It was also shown that fluctuations in die temperature due to on-chip activity and ambient changes cause negligible effects on sensor readings.

A design can contain various numbers of voltage sensor instances such as, in one example, 162 TDC instances, laid out in 8 rows and 22 columns. More or less voltage sensors can be used in the design as may be desired. The layout density can decrease to use less resources on the FPGA and different chips have different available resources. In diagram 500 of FIG. 5, a time series visualization of an EMFI pulse is illustrated in which each TDC measurement is shown in gray, and the average of the full grid is shown in black. The pulse rise and fall times are labeled and subsequent reflections are annotated. The full experimental design used 29% of LUTs and 5% of flip-flops available on the Artix-7. Each TDC used 108 LUTs and 34 flip-flops. The FPGA die was approximately 6.5 mm wide and 10 mm tall inside the 15 mm×15 mm package. Some regions do not contain the elements needed to construct a TDC and so cannot be monitored directly. However, the sparse 2D data from this grid of sensors can be processed with an interpolation filter to estimate spatial voltage throughout the die, even where no sensors are present.

To test the voltage sensor against observable digital faults an additional programmable logic design was implemented which contains a grid of linear-feedback shift registers (LFSRs). LFSRs can be used as compact pseudorandom number generators in digital systems. In particular, an LFSR is a shift register where the first bit is a linear function of the prior state. In a 16-bit design, bit-0 is the XNOR of bits 3, 12, 14, and 15. To make this circuit more susceptible to timing faults, a chain of buffers can be added into the feedback function. This increases the total delay of the function and makes it more difficult to meet the setup timing requirement on the bit-0 register. The LFSR grid is enabled for 256 clock cycles and any LFSRs that do not report the expected value are considered faulted.

Figure 5:
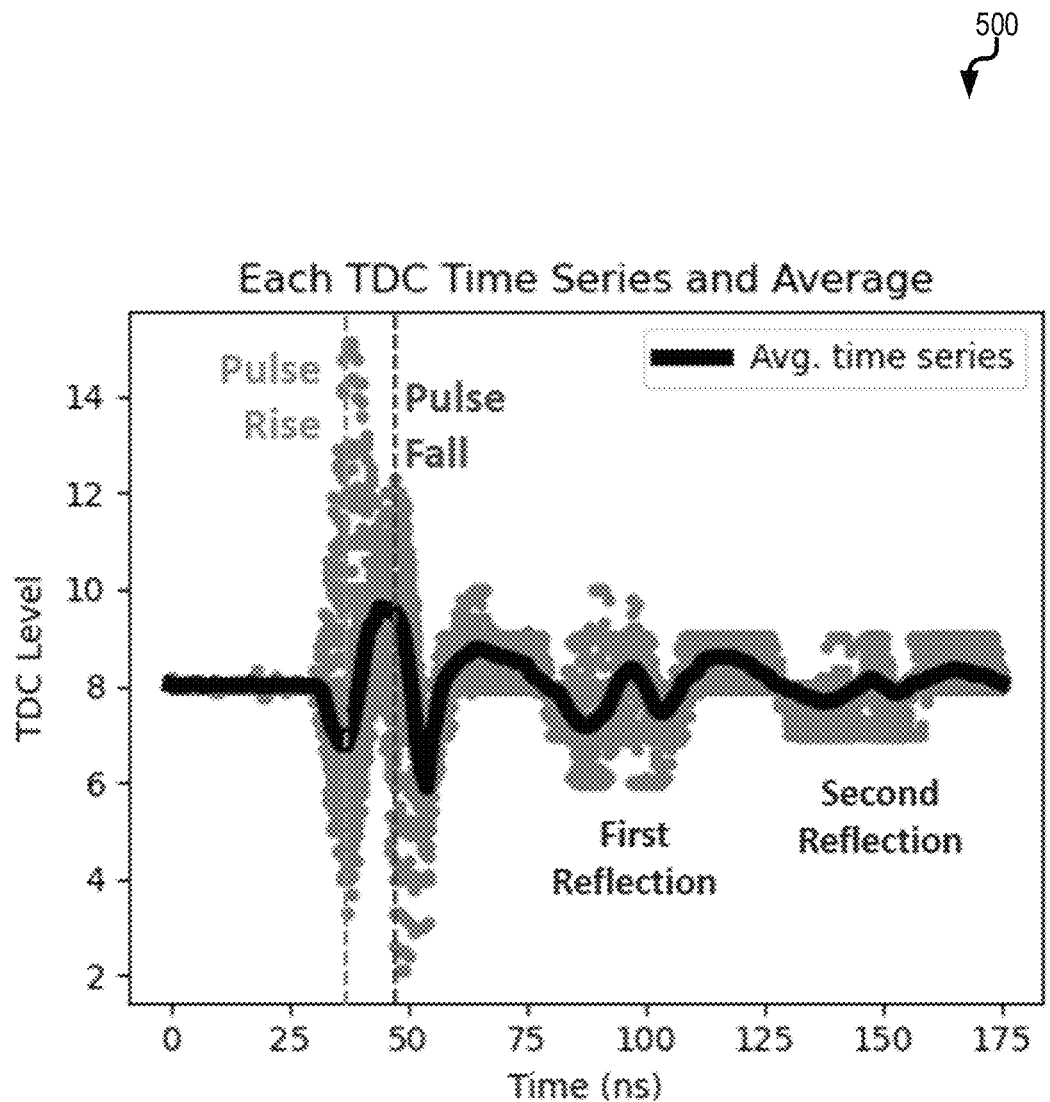
FIG. 5 is a diagram illustrating a time series visualization of an electromagnetic field injection (EMFI) pulse.

As noted above, distributed voltage sensors can be used to visualize an EMFI pulse over time. In the example of diagram 500 of FIG. 5, visualized is performance of an EMFI attempt at a particular probe position over a 175 ns range of pulse-delays. The 10 ns-wide pulse at each delay was repeated 10 times to calculate an average measurement with improved voltage resolution. FIG. 5 shows each TDC's response in the grid and the average of the full grid. The approximate times of peak EMFI pulse rise and fall are marked. Two reflections of the pulse are also visible in the average time series about 50 ns and 100 ns after the initial pulse. From these visualizations, it can be seen that some sensors in the grid experience high voltage while others experience low voltage during the pulse rise and fall. Next, each TDC measurement can be mapped to its approximate location in the FPGA to visualize an EMFI pulse over space.

Figure 6:
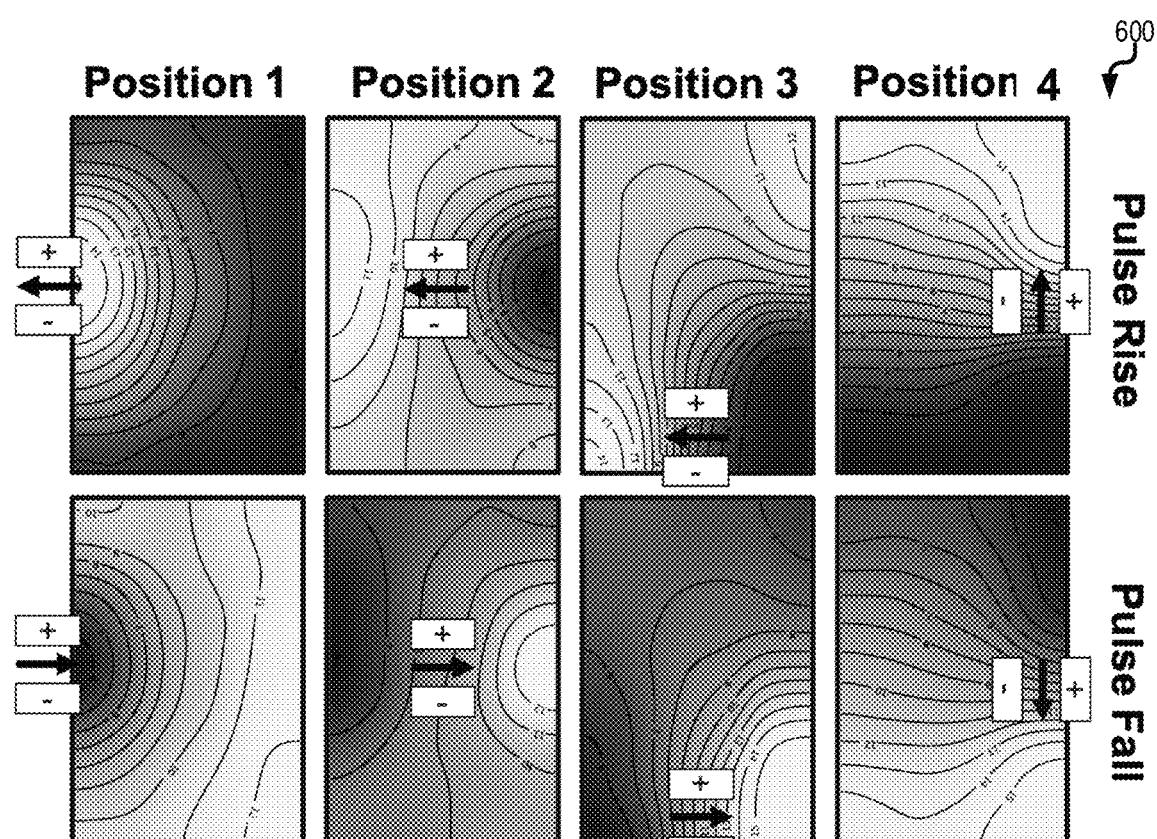
FIG. 6 is a diagram illustrating example EMFI illustrations.

FIG. 6 is a diagram 600 which illustrates eight spatial TDC measurements at selected time epochs of interest. Visualizations of this nature can be referred to as a vulnerability map. Other variations of vulnerability maps can be utilized which visually convey potential areas of vulnerability on an IC. Referring again to FIG. 6, each column shows a different probe location, while the two rows show the time epochs during the pulse rise (top) and pulse fall (bottom). The approximate position of the crescent probe terminals is represented by the rectangles and expected EMF direction is represented by an arrow. These high-resolution images were interpolated from the grid of 162 sensors shown in FIG. 3.

Referring still to FIG. 6, the top measurement epochs were observed at the peak of the pulse rise, about 5 ns after the pulse generator fired. The bottom measurement epochs are from 8 ns later, just after the falling edge of the pulse. During the pulse rise, current through the probe coil causes EMF inside the FPGA, resulting in a redistribution of charge in the PDN. For example, for position-1, with the probe placed on the left-center edge of the die, charge is pulled from surrounding areas toward that edge, resulting in a voltage swell. During the pulse fall, the EMF reverses direction due to a reversal in the magnetic flux causing an inverted response in the PDN. It is important to note that the first three probe orientations have a rotation of 0-degrees, meaning that the dominant EMF is horizontal, pointing left on the rise and right on the pulse fall. Position 4 show the probe rotated 90-degrees clockwise. At this position/orientation, EMF is vertical and points up on the pulse rise and down on the pulse fall. This combination of temporal and spatial voltage resolution greatly improves EMFI visibility.

A LFSR circuit was designed to be vulnerable to timing faults. Higher than expected propagation delays through the feedback function or minor clock disruptions were expected to cause setup timing violations at the bit-0 flip-flop, leading to sampling errors. It was expected that LFSR circuits placed in regions of low voltage would be faulted due to increased propagation delays.

A sweep of EMFI attempts on the LFSR design and the TDC design were performed separately. For both designs, the EMFI probe was moved around the same 19×19 grid over the 15 mm×15 mm package and pulses were injected over a range of pulse-delays. The TDC design was tested with 250 V pulses while the LFSR design required a higher voltage of 650 V to achieve consistent faults.

In general, it was observed that areas with greater TDC-level fluctuation matched regions where more LFSRs reported faulted outputs. These faults can be caused by incorrect flip-flop sampling due to slow propagation time on the LFSR feedback function. Therefore, it was shown that locations showing TDC levels during EMFI attempts correlate highly with LFSR faults and during EMFI attempts.

Figure 7:
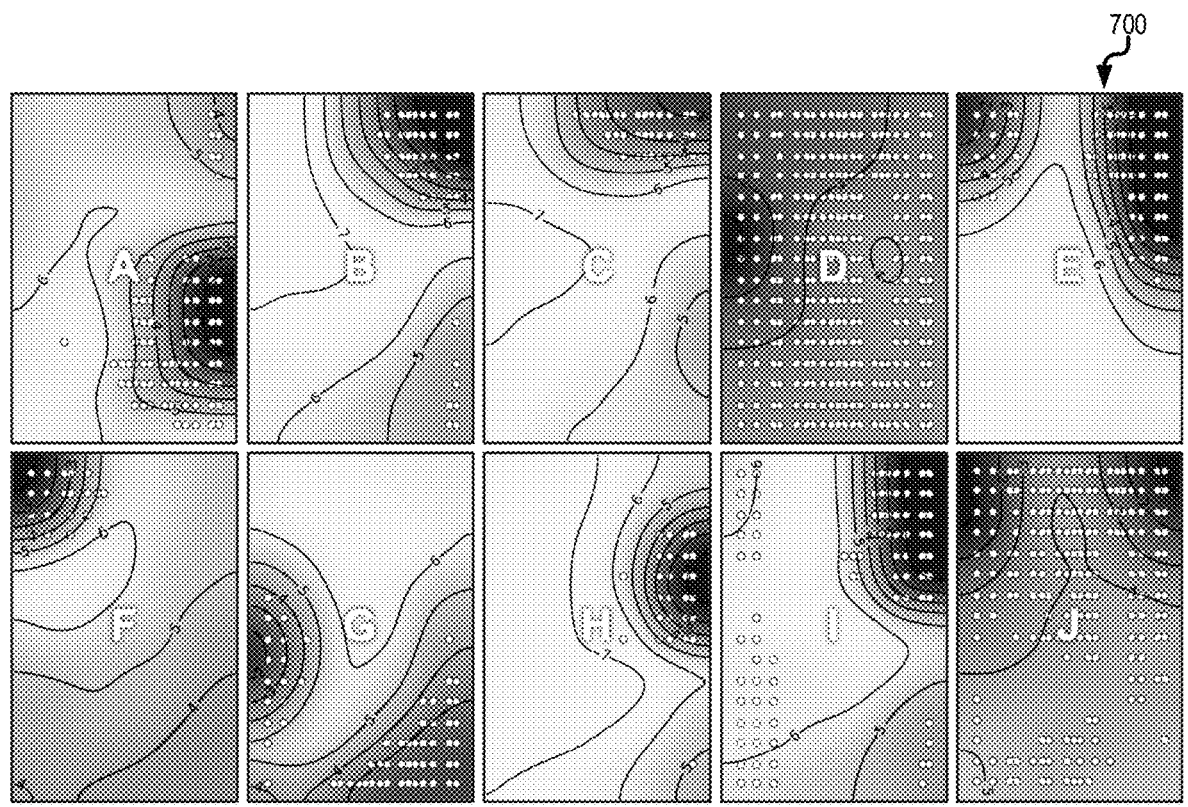
FIG. 7 is a diagram visualizing linear-feedback shift register faults in an FPGA.

FIG. 7 is a diagram 700 that illustrates the relationship between minimum TDC levels detected and LFSR fault locations for 10 arbitrary probe positions. FIG. 7 is another example of a vulnerability map. In FIG. 7, LFSR faults were compared with minimum TDC readings for 10 randomly chosen probe positions are shown. It was shown that most LFSR faults correlate with low TDC level. Most faulted LFSRs in FIG. 7 appear in locations where the observed TDC level drops below 4. However, some outliers are present. For example, the EMFI attempt at position "I" results in LFSR faults along the left side of the FPGA where minimum TDC level is relatively high. By inspecting the placement and routing of these faulted LFSRs, it was determined that this fault mode is likely due to induced current on the reset line. Large clusters of LFSRs are controlled by the same regional clock and reset lines. If a branch of the global clock or reset lines are glitched, all downstream LFSRs are affected, even where voltage conditions are not greatly impacted. In this case, areas of high TDC level fluctuations do not correlate well with locations of digital faults. This illustrates the important point that voltage sensors are well suited to detect faults caused directly by PDN effects but may not be able to detect all types of faults. While locations of voltage highs and lows in the voltage sensor grid may not always correlate with locations of faults, when these types of faults occur, voltage fluctuations may be visible in some regions of the voltage sensor grid even if faults occur in other regions. As such, sensors can be placed throughout the FPGA especially because voltage effects in one location may lead to faults at other locations.

Figure 8:
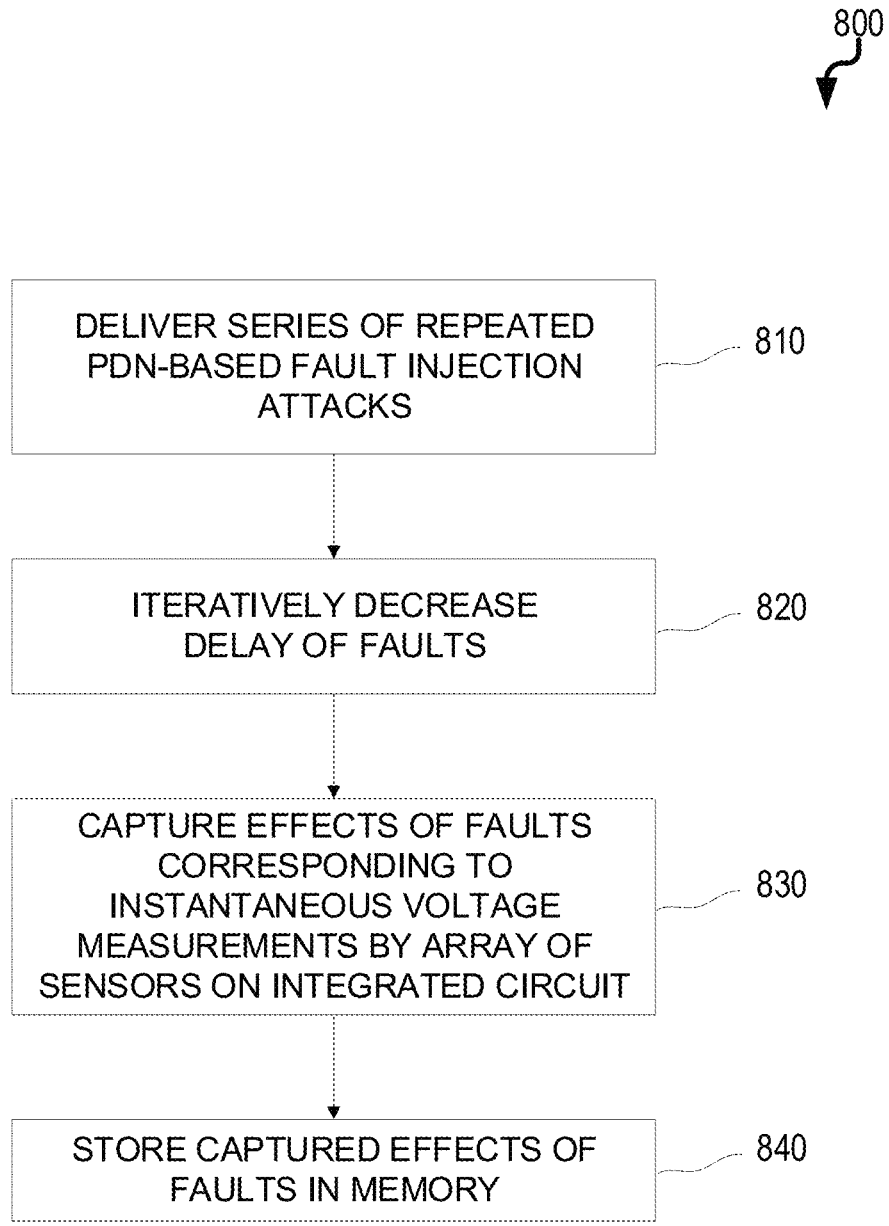
FIG. 8 is a second process flow diagram for characterizing fault injection on power distribution networks of an IC with timing sensors.

FIG. 8 is a process flow diagram 800 for characterizing power distribution network-based fault injection vulnerabilities in an IC. Initially, at 810, a series of repeated power distribution network-based fault injection attacks are delivered. Thereafter, at 820, an array of sensors forming part of the IC captures effects of the fault attempt during each iteration. The captured effects correspond to instantaneous voltage measurements by such sensors. These captured effects are used, at 830, to generate a vulnerability map.

The current subject matter demonstrates that even without causing any digital faults, the voltage sensor can reveal the pre-fault, analog effects for an EMFI attempt on an IC. This pre-fault feedback allows for tuning EMFI parameters to target a specific chip region and then grow the analog effect to an amplitude that may cause a digital fault. For example, in a design with a single cryptographic core, EM or thermal side-channels can be used to estimate the location of the core within the FPGA. On an identical FPGA programmed with the voltage sensor design bitstream, the optimal probe type and probe position to have a voltage effect at the desired FPGA die location can be determined. From there, pulse amplitude and pulse-width can be tuned to increase the magnitude of that effect which may be more likely to result in a digital fault in the cryptographic core. This approach is advantageous in that it is far more efficient than sweeping over the vast multi-dimensional EMFI parameters space until a successful fault is achieved.

The captured data (i.e., the effects of the pulses) can also be used to reduce fault susceptibility in FPGA designs. Since digital faults correlate with voltage fluctuation due to PDN-based faults, critical circuits can be placed in areas with low voltage variation and fault detection countermeasures can be placed in areas with high voltage variation. For example, some TDCs in the corners experience reduced variation in value during EMFI than in the center of the die. For redundancy countermeasures, it can be desirable to place duplicate circuits in areas that are difficult to affect simultaneously with EMFI. Autocorrelation of spatial TDC data can be used to identify these low-correlation regions.

As provided herein, the voltage sensor grid can be used as PDN-based fault injection detection countermeasure. The sensors may continuously sample and go into an alarm state when they detect high or low voltage. These sensors can be placed sparsely throughout the FPGA or surrounding critical circuits. With such an arrangement, the sensors can detect fault attempts, rather than detect realized faults. This detection can be desirable because one could detect if an adversary is attempting to cause digital faults before they are successful.

As part of the placement and routing process in FPGA development environments, a tool can be provided that uses spatial EMFI vulnerability to place and route critical circuits in regions that are vulnerable or not vulnerable to voltage swings.

After design synthesis, "cells" and "nets", which are circuit components and wires, can be marked to determine how they should be placed. For example, an EMFI detection countermeasure can be placed in regions that experience high voltage fluctuations during EMFI. A cryptographic core, however, should be placed somewhere that is not as vulnerable to voltage fluctuations caused by EMFI.

The voltage sensors can be used to build an accurate model of how EMFI influences voltage fluctuations under various FPGA loading conditions. High dynamic power consumption in one area due to increased digital logic placement may impact sensitivity to voltage changes in that area. The tool, in some variations, can require information for each FPGA and power consumption data on a particular design to perform this analysis.

The sensors can also be used to quantify electromagnetic interference inside an FPGA. The sensors can be used to evaluate physical countermeasures that aim to reduce internal EM interference, such as metal shielding.

Metal lids on FPGAs can act as an EM shield, preventing externally injected signals from impacting the power distribution network inside the chip's die. The sensors can be used to measure attenuation over time and 2D space under various material lids and identify location of imperfections in metal shielding.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the order shown, or sequential order, to achieve desirable results. Other implementations may be within the scope of the following claims.

What is claimed is:

1. A method for characterizing power distribution network-based fault injection vulnerabilities in an integrated circuit (IC) comprising:
   delivering a series of repeated power distribution network-based fault injection attacks comprising a plurality of faults;
   capturing, by an array of sensors forming part of the IC, effects of the faults, the captured effects corresponding to instantaneous voltage measurements by such sensors; and
   generating, based on the captured effects of the fault, a vulnerability map visually identifying locations of vulnerable locations in the IC.

2. The method of claim 1, wherein the faults are commenced at an initial pulse delay and a delay of subsequent faults is iteratively stepped.

3. The method of claim 2, wherein the delivering comprises:
   arming a pulse generator to deliver a series of electromagnetic pulses through a probe on to the IC, the pulses commencing at the initial pulse delay.

4. The method of claim 3 further comprising:
   selectively moving the probe over a surface routing relative to the IC.

5. The method of claim 4, wherein the probe is moved using a probe positioner.

6. The method of claim 3, wherein the probe comprises a crescent probe.

7. The method of claim 3, wherein the probe comprises a cylindrical probe or any other type of nearfield electromagnetic (EM) probe.

8. The method of claim 1 further comprising:
analyzing the captured effects to identify one or more vulnerabilities in the IC.

9. The method of claim 8 further comprising:
associating sensors on the IC with other components on the IC such that the one or more vulnerabilities are specified in relation to components in which the associated sensor captures effects above a pre-defined threshold.

10. The method of claim 1 wherein the IC comprises a field-programmable gate array (FPGA).

11. The method of claim 1, wherein the voltage array of sensors comprises:
time-to-digital converter sensors spatially characterize voltages on an on-chip power distribution network (PDN) forming part of the IC while the faults are being delivered.

12. The method of claim 1, wherein the sensors comprise: ring oscillators.

13. A system for characterizing power distribution network-based fault injection vulnerabilities in an integrated circuit (IC) comprising:
at least one probe;
a probe positioner coupled to the at least one probe; and
a controller comprising memory and at least one data processor, the memory storing instructions which, when executed, result in operations comprising:
delivering a series of repeated power distribution network-based fault injection attacks comprising a plurality of faults across the IC using the at least one probe while it is moved by the probe positioner;
wherein an array of sensors forming part of the IC capture effects of the faults during each iteration, the captured effects corresponding to instantaneous voltage measurements by such sensors.

14. The system of claim 13, wherein the delivering comprises:
arming a pulse generator to deliver a series of electromagnetic pulses through the probe on to the IC.

15. The system of claim 14, wherein the operations further comprise:
selectively moving the probe over a predetermined surface routing relative to the IC.

16. The system of claim 14, wherein the probe comprises a cylindrical probe.

17. The system of claim 13, wherein the operations further comprise:
generating, based on the captured effects of the fault, a vulnerability map visually identifying locations of vulnerable locations in the IC.

18. The system of claim 17, wherein the operations further comprise:
associating sensors on the IC with other components on the IC such that the one or more vulnerabilities are specified in relation to components in which the associated sensor captures effects above a pre-defined threshold.

19. The system of claim 13 wherein the IC comprises a field-programmable gate array (FGPA).

20. The system of claim 13, wherein the sensors comprise:
time-to-digital converter sensors spatially characterize voltages on an on-chip power distribution network (PDN) forming part of the IC while the faults are being delivered.

21. The system of claim 13, wherein the sensors comprise: ring oscillators.

22. A method for characterizing power distribution network-based fault injection vulnerabilities in an integrated circuit (IC) incorporating an array of voltage sensors forming part of the IC, comprising:
capturing effects corresponding to instantaneous voltage measurements by the sensors; and
based on the captured effects, identifying one or more vulnerable locations in the IC.

* * * * *